Patented Apr. 12, 1938

2,113,565

UNITED STATES PATENT OFFICE 2,113,565

ORGANIC MERCURY COMPOUNDS

Carl N. Andersen, Wellesley Hills, Mass., assignor to Lever Brothers Company, a corporation of Maine No Drawing. Application October 18, 1933, Serial No. 694,204. Renewed May 19, 1937

5 Claims. (Cl. 260—13)

The present invention relates to the production of certain new organic mercury compounds.

It is an object of the invention to produce new organic mercury compounds useful as germicides and for other therapeutic purposes.

I have discovered that when the carboxyl hydrogen atoms of aldehydo acids and ketonic acids are substituted by basic radicals of phenylmercury compounds, or certain similar aromatic mercury compounds, compounds are produced which have high potency as antiseptics and germicides, and at the same time are characterized by relatively low toxicity and other desirable properties.

The compounds constituting the subject matter of the invention claimed in this patent may be described as having the general formula $(RHg)_xR_1$, in which R represents an aromatic structure, which may be an aromatic nucleus with or without side chains, and in which none of the nuclear or side chain carbons has direct linkage with any element other than hydrogen, carbon and mercury; in which $x$ is an integer having a value of 1 or more; and in which $R_1$ represents an acid radical of an aliphatic carboxylic acid containing a carbonyl group other than in the carboxyl group; that is to say, an acid radical of the class of organic acids comprising the aldehydo and ketonic acids, which said radical is linked to an RHg group or groups through replacement of a carboxyl hydrogen atom or atoms. R may stand for the phenyl group, $C_6H_5$, or for aromatic hydrocarbons, as for example, polycyclic hydrocarbons in which all the nuclear carbons other than the one attached to mercury, and any side chain carbons, have their valences satisfied by hydrogen and carbon.

Examples are the para diphenyl

and naphthyl

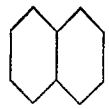

groups. The expression "aromatic structure" as used herein is intended to be generic and include an aromatic nucleus with or without side chains.

The compounds may be prepared in various ways. The following specific examples illustrate the invention:

Example 1

5.88 grams of phenylmercury hydroxide were dissolved in 2 liters of water. The solution was filtered to remove any gums or other insoluble materials present. To the filtrate was added 2.55 grams of laevulinic acid in 20 cc. of water. The mixture was allowed to stand for 24 hours, when a small precipitate had formed. The mixture was then evaporated to one-third of its original volume and then allowed to cool and stand until precipitation was complete. The precipitate was then separated, washed and dried. It was then dissolved in benzene and recrystallized from water. The recrystallization may take place from alcohol or another suitable medium, if desired. This precipitate has the formula $$CH_3-CO-(CH_2)_2-CO-OHgC_6H_5$$

Example 2

17.64 grams of phenylmercury hydroxide were dissolved in 4 liters of water. The solution was filtered and to the filtrate was added 9.9 grams of pyruvic (pyroracemic) acid in 25 cc. of water. The mixture was allowed to stand for 12 hours and a very small precipitate formed. The volume was then concentrated to bring down the major portion of the salt formed. The precipitate was then separated, washed and dried. The product has the formula $CH_3-CO-CO-OHgC_6H_5$, for phenylmercury pyruvate.

The above examples of gamma and alpha ketonic acids respectively are given merely as illustrative of the general class of ketonic acids which are embraced by my invention.

An acid, given merely as illustrative of aldehydo acids, that may be reacted with phenylmercury hydroxide to form salts is glyoxylic acid.

In the examples, approximately a 10% excess of the acid was added thus insuring the complete conversion of the phenylmercury hydroxide.

In the examples, the method employed is the general neutralization method of reacting a base with an acid to produce a salt and water. The application of this method to the preparation of phenylmercury salts of organic acids is being claimed in my co-pending application Serial No. 694,198 filed October 18, 1933. This method has the advantage that the only by-product of the reaction is water.

Another method that may be employed in preparing these salts is the so-called precipitation method wherein a phenylmercury salt of an organic acid, e. g. phenylmercury acetate is reacted with an acid capable of forming phenylmercury salts of relatively low solubility as compared with the salts of the first acid and that are also relatively insoluble as compared with the first acid itself. This general method as applied to the preparation of phenylmercury salts of organic acids generally is described and claimed in my co-pending application Serial No. 694,199 filed October 18, 1933.

The phenylmercury salts of the acids of the aldehydo and ketonic groups are characterized by highly satisfactory antiseptic and germicidal properties. Tests to determine the efficacy of the laevulinate in killing *B. typhosus* and *Staph. aureus* were carried on under the following conditions.

Aqueous solutions of varying dilutions from 1:10,000 upward until killing ceased were made up.

These dilutions were employed in the conduct of the tests by the following methods:

Circular 198, U. S. Dept. of Agriculture, Dec. 1931, described as F. D. A. method against *Eberthella typhi* (typhoid bacillus) at 37° C. and F. D. A. Special method against *Staph. aureus* at 37° C.

The maximum dilutions at which killing in 15 minutes resulted are as follows:

B. typhosus_____ 1:100,000
Staph. aureus_____ 1: 30,000

These compounds are characterized by relatively low toxicity.

These new compounds may be used directly as germicides in aqueous or other solutions or may be formed into various preparations such as mouth washes, tooth pastes, soaps, etc. and such compositions are considered to be within the scope of the invention as defined in the appended claims.

I claim:

1. A new organic mercury compound of the general formula $RHgR_1$, in which R represents an aromatic structure and in which none of the carbon atoms has direct linkage with any element other than hydrogen, carbon and mercury; and in which $R_1$ represents an acid radical of an aliphatic mono-basic carboxylic acid containing a carbonyl group other than in a carboxyl group, which said radical is linked to an RHg group through replacement of the carboxyl hydrogen atom.

2. A phenylmercury salt of an aliphatic ketonic acid.

3. Phenylmercury glyoxylate.

4. Phenylmercury laevulinate.

5. Phenylmercury pyruvate.

CARL N. ANDERSEN.